United States Patent Office.

JOHN ZENGELER, OF CHICAGO, ILLINOIS.

Letters Patent No. 113,127, dated March 28, 1871; antedated March 25, 1871.

IMPROVEMENT IN COLORING AND STAINING MARBLE.

The Schedule referred to in these Letters Patent and making part of the same.

*To all whom it may concern:*

Be it known that I, JOHN ZENGELER, of Chicago, in the county of Cook and State of Illinois, have invented a new and useful Improvement in the Process of Staining Marble and similar substances; and I do hereby declare that the following is a full, clear, and exact description thereof.

The nature of my invention consists in the fixing upon marble or other similar substances any colored design desirable by the following described agents and processes:

My method consists in applying, by means of a brush, to dry marble or other similar substances an oily liquid paste, carefully freed from all moisture, and prepared by taking any of the dried or anhydrous oily volatile solvents of the aniline colors, such as naphtha, benzole, aniline oil, or such as are found in the oily and volatile products of the distillation of coal-tar, petroleum, or equivalent substances, and combining any one or more of the same with any one or more of the various coloring substances derived from coal-tar and similar substances.

The usefulness and advantage of my invention may be estimated by a consideration of the following facts:

First, the colors, when applied, become permanently fixed by imbibition, so as to be irremovable by acids, alkaline or any other solution, or by wear, or by the cleaning and polishing operations to which such substances are or may be subjected.

Second, the staining or coloration of the marble is remarkable for variety and brilliancy of tint.

Third, the application of the said colors in a liquid oily paste from which all moisture has been carefully excluded prevents all blurring and spreading, and gives to the lettering, flowers, or other designs a definiteness, clearness, and delicacy of outline heretofore unattainable by any other process.

To enable those skilled in the arts to which my invention appertains to apply and use the same, I will now proceed to describe the manner in which the staining is or may be accomplished.

I take any one or any combination of the above-mentioned coloring materials and dissolve the same in any one or more of the oily volatile liquids also above-mentioned, always selecting in preference that one or that combination of the same possessing the greatest power to dissolve or liquefy the particular coloring matter employed. The addition of the aniline coloring matter is made in consecutive small portions, until it is found by trial that the thick or pasty liquid obtained will make a sharp and well-defined line when applied to marble, without blurring or spreading upon the edges. When this condition is fulfilled the preparation will generally have a sirupy or pasty consistency, and may be applied by means of a brush to the marble or other substances upon the surface of which letters, flowers, or other designs have been drawn with a pencil or otherwise.

The coloring matter may be applied without using any artificial heat, provided the marble has been previously kept in a dry place until free from superficial moisture. This is due to the great penetrating power of the anhydrous oily paste when applied to the dry stone, and gives to my process an advantage over all others, as it thereby secures great economy in the manipulation. When labor and expense are not important, and time of great value, the stone may be heated to 100° Fahrenheit before applying the color, thereby opening the pores of the stone and hastening the process. After the painting is finished it is best that the stone should in all cases be heated to a temperature not to exceed 212° Fahrenheit, for the purpose of expelling the volatile oil and leaving the coloring matter in the stone.

I am aware of Asa Hill's patent of November 27, 1860, and Smith Gardner's, of February 1, 1870. I am also aware that various other processes of delineating or staining upon marble, &c., were in use and in print long before the date of those patents. I make, therefore, no broad claim, but only to have invented a new, useful, and improved process for the purposes above described.

Asa Hill's patent differs from my invention in the following particulars, which I therefore disclaim:

First, the use of inorganic or mineral salts as coloring materials, instead of organic aniline colors, which I use only and exclusively.

Second, the formation of the color within the body of the stone by chemical precipitation caused by the successive introduction of two or more diverse mineral salts, acids, or alkalies, instead of directly introducing the ready-formed coloring matter in a state of solution, as in my process, by which I save much time, simplify the manipulation, and am enabled with ease and certainty to produce any particular shade of color that I may desire.

Third, the use of water as a solvent for the materials used, instead of the anhydrous volatile oils used in my process.

Fourth, heating the stone by direct application of steam, thereby introducing water into the same, instead of using the stone in a dry state, as in my process.

Fifth, the necessity of heat to make available the penetration of the color, instead of dispensing with it, as in my process, in which it is not necessary or even important for that purpose, but admissible if desired, it being necessary only for the expulsion of the volatile oil after the work is completed.

I also disclaim Smith Gardner's process, as well as all others claiming to color the marble, &c., throughout the entire mass. In Smith Gardner's process the materials and processes are such as to cause the color to spread as widely and rapidly as possible, making it, therefore, impossible to make any clear or well-defined marks, letters, or delineations. My process is the reverse of this, and therefore unsuited to the coloring of the stone through its mass, as it prevents the above-mentioned wide and rapid spreading by the use of dry aniline colors dissolved in anhydrous oils, and by the other precautions above described, and thereby secures a clearness and sharpness of outline hitherto unattainable.

My process differs from that of Smith Gardner's, also, in the fact that I use only anhydrous stone and materials, and require no heating of the stone to secure penetration of the color; also, in the fact that his is a process of dyeing, whereas mine is a process of delineation or painting.

What I claim as my invention, and wish to secure by Letters Patent, is—

The method herein described for the delineation of colored designs upon marble, stone, &c., by means of the anhydrous volatile oily paste or liquid above described, or its equivalent, and by means of the processes also above described, or their equivalents.

JOHN ZENGELER.

Witnesses:
C. F. CHITSON,
G. A. MARINER.